(12) United States Patent
Uchida (10) Patent No.: US 10,724,574 B2
(45) Date of Patent: Jul. 28, 2020

(54) BEARING DEVICE

(71) Applicant: MINEBEA MITSUMI Inc., Nagano (JP)

(72) Inventor: Tadashi Uchida, Saku (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/424,604

(22) Filed: May 29, 2019

(65) Prior Publication Data

US 2019/0368541 A1 Dec. 5, 2019

(30) Foreign Application Priority Data

May 31, 2018 (JP) ................. 2018-105544

(51) Int. Cl.
| | |
|---|---|
| *F16C 19/18* | (2006.01) |
| *F16C 19/54* | (2006.01) |
| *F16C 33/58* | (2006.01) |
| *F16C 33/78* | (2006.01) |
| *F16C 33/80* | (2006.01) |
| *F16C 35/063* | (2006.01) |
| *G11B 19/20* | (2006.01) |
| *H02K 5/173* | (2006.01) |

(52) U.S. Cl.
CPC ............. *F16C 19/18* (2013.01); *F16C 19/54* (2013.01); *F16C 33/583* (2013.01); *F16C 33/783* (2013.01); *F16C 33/7816* (2013.01); *F16C 33/80* (2013.01); *F16C 35/063* (2013.01); *G11B 19/2009* (2013.01); *H02K 5/1737* (2013.01); *F16C 2226/40* (2013.01); *F16C 2370/12* (2013.01)

(58) Field of Classification Search
CPC ........ F16C 19/18; F16C 19/54; F16C 33/583; F16C 33/7816; F16C 33/7886; F16C 33/80; F16C 35/063; F16C 2226/40; F16C 2370/12; F26C 35/077; G11B 19/2009; H02K 5/1732; H02K 5/1737
USPC ................... 384/49, 114, 130, 504, 513, 535
See application file for complete search history.

(56) References Cited

U.S. PATENT DOCUMENTS

| | | | | |
|---|---|---|---|---|
| 5,138,209 A | * | 8/1992 | Chuta ................ | G11B 19/2009 310/51 |
| 5,483,113 A | * | 1/1996 | Sakuragi ............ | G11B 19/2009 310/156.26 |
| 5,493,159 A | * | 2/1996 | Norris ................... | H02K 3/522 310/71 |

(Continued)

FOREIGN PATENT DOCUMENTS

| | | | | |
|---|---|---|---|---|
| EP | 1394776 A1 | * | 3/2004 | ............ F16C 35/077 |
| JP | 2002039171 A | * | 2/2002 | |

(Continued)

*Primary Examiner* — Marcus Charles
(74) *Attorney, Agent, or Firm* — Pearne & Gordon LLP (57) ABSTRACT

A bearing device includes an annular hub cap facing an inner ring. An inner annular surface of the hub cap abuts a part of one end surface of the inner ring which extends from an inner peripheral edge to an intermediate position located on the way from the inner peripheral edge to an outer peripheral edge. An annular adhesive retaining portion is formed between the area extending from the intermediate position to the outer peripheral edge of one end surface and at least an inclined annular surface of the hub cap.

6 Claims, 5 Drawing Sheets

(56) References Cited

U.S. PATENT DOCUMENTS

| | | | | |
|---|---|---|---|---|
| 5,880,545 | A * | 3/1999 | Takemura | F16C 33/765 310/67 R |
| 6,246,137 | B1 * | 6/2001 | Obara | H02K 5/1737 310/90 |
| 6,299,358 | B1 * | 10/2001 | Prater | B29C 65/1483 384/537 |
| 6,316,855 | B1 * | 11/2001 | Moosmann | G11B 19/2009 310/67 R |
| 6,469,410 | B2 * | 10/2002 | Akahori | G11B 19/2009 310/156.45 |
| 6,563,243 | B2 * | 5/2003 | Obara | F16C 35/061 310/90 |
| 6,679,501 | B1 * | 1/2004 | Pelstring | F16C 33/102 277/301 |
| 6,794,774 | B2 * | 9/2004 | Obara | G11B 19/2009 310/67 R |
| 7,072,148 | B2 * | 7/2006 | Tsuchiya | G11B 5/4813 360/265.3 |
| 2013/0301160 | A1 * | 11/2013 | Nanasawa | F16C 33/7846 360/97.13 |

FOREIGN PATENT DOCUMENTS

| | | | | |
|---|---|---|---|---|
| JP | 2004092666 A * | 3/2004 | | F16C 33/783 |
| JP | 2004092870 A * | 3/2004 | | F16C 33/7886 |
| JP | 2016-156470 A | 9/2016 | | |
| WO | WO-0045498 A2 * | 8/2000 | | H02K 15/14 |

* cited by examiner

BEARING DEVICE

CROSS REFERENCE TO RELATED APPLICATIONS

This application claims the benefit of Japanese Patent Application No. 2018-105544, filed on May 31, 2018, which is hereby incorporated by reference in its entirety.

BACKGROUND

Technical Field

The present disclosure relates to a bearing device.

Background

As a bearing device for swingably supporting a swing arm of a hard disk drive device, a pivot assembly bearing device is used. In the pivot assembly bearing device, a shaft for making the swing arm swingable is supported by two rolling bearings arranged coaxially, and an annular hub cap is fixed to a tip end side of the shaft.

In a conventional bearing device of this type, a hub cap is fixed to the shaft so as to cover the portion between the outer ring and the inner ring of the rolling bearing, and a small gap (labyrinth gap) is formed between the hub cap and the inner circumferential surface of the outer ring. Due to this labyrinth gap, the flow of air within the rolling bearing is suppressed to reduce scattering of grease (see, for example, Japanese Patent Application Laid-Open No. 2016-156470).

In a conventional bearing device of this type equipped with a hub cap, the hub cap is forced onto the shaft from the tip end side of the shaft to fix the hub cap to the shaft by press fitting. In such a bearing device in which the hub cap is press-fitted, it is necessary to enlarge the distance between the hub cap and the inner ring in order to avoid interference between the hub cap and the inner ring to prevent generation of a dent in the inner ring of the rolling bearing. For this purpose, it is necessary to fix the hub cap at a specified position of the shaft in order to form a labyrinth gap of a specified width between the hub cap and the inner circumferential surface of the outer ring to suppress dispersion of particles originated from the bearing device while avoiding interference between the hub cap and the inner ring. It is a difficult operation to fix the hub cap at a specific position of the shaft by press-fitting of the hub cap to the shaft in order to form a labyrinth gap of a specific width.

The present disclosure is related to providing a technique which enables to suppress dispersion of particles.

SUMMARY

In accordance with one aspect of the present disclosure, a bearing device includes at least one rolling bearing having an outer ring, an inner ring arranged on a radially inner side of the outer ring, and a plurality of rolling elements arranged between the outer ring and the inner ring; a shaft fixed to an inner circumferential surface of the inner ring of the rolling bearing; and an annular hub cap fixed to an outer circumferential surface of the shaft while abutting one end surface of the inner ring in an axial direction of the shaft. An outer circumferential surface of the hub cap is opposite to an inner circumferential surface of the outer ring, and a labyrinth gap is formed between the outer circumferential surface of the hub cap and the inner circumferential surface of the outer ring. The hub cap has an inner annular surface (first surface) that is an annular surface extending radially outwards from an inner circumferential surface of the hub cap bonded to the outer circumferential surface of the shaft, an inclined annular surface (second surface) that is an annular surface extending radially outwards from an outer peripheral edge of the inner annular surface while inclined so as to come away from the rolling bearing, and an outer annular surface (third surface) that is an annular surface extending radially outwards from an outer peripheral edge of the inclined annular surface. The inner annular surface contacts a part of one end surface of the inner ring, which extends from an inner peripheral edge to an intermediate position located on the way from the inner peripheral edge to an outer peripheral edge. An adhesive retaining portion that is a predetermined annular space is formed between the area extending from the intermediate position to the outer peripheral edge of the inner ring and at least the inclined annular surface of the hub cap.

In the bearing device according to the disclosure, it is possible to suppress dispersion of particles.

DETAILED DESCRIPTION

Hereinafter, an embodiment of the present disclosure will be described with reference to the accompanying drawings.

Figure 1:
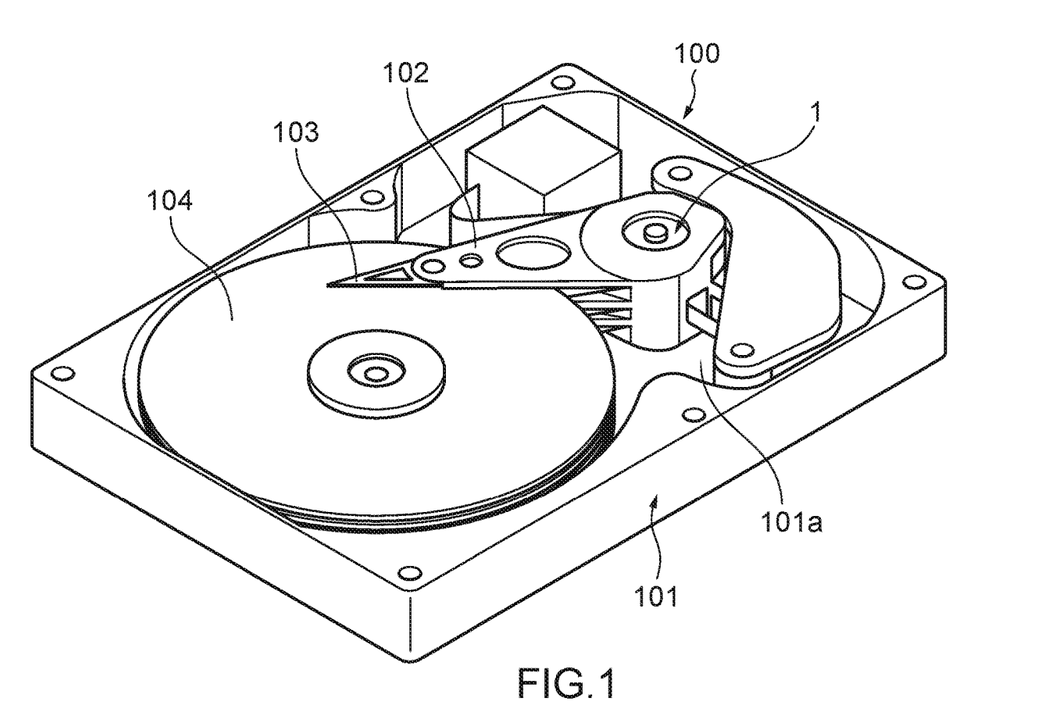
FIG. 1 is a schematic perspective view of the structure of a hard disk drive device having a pivot assembly bearing device as a bearing device according to an embodiment of the present disclosure.

FIG. 1 is a schematic perspective view of the structure of a hard disk drive device 100 having a pivot assembly bearing device 1 as a bearing device according to the embodiment of the present disclosure. As shown in FIG. 1, the pivot assembly bearing device 1 is fixed to a bottom portion 101*a* of a housing 101 of the hard disk drive device 100, and swingably supports a swing arm 102. In this hard disk drive device 100, a magnetic head 103 arranged at the distal end of the swing arm 102 moves on a rotating magnetic disk 104, whereby information is recorded on the magnetic disk 104, and information recorded on the magnetic disk 104 is read.

Figure 2:
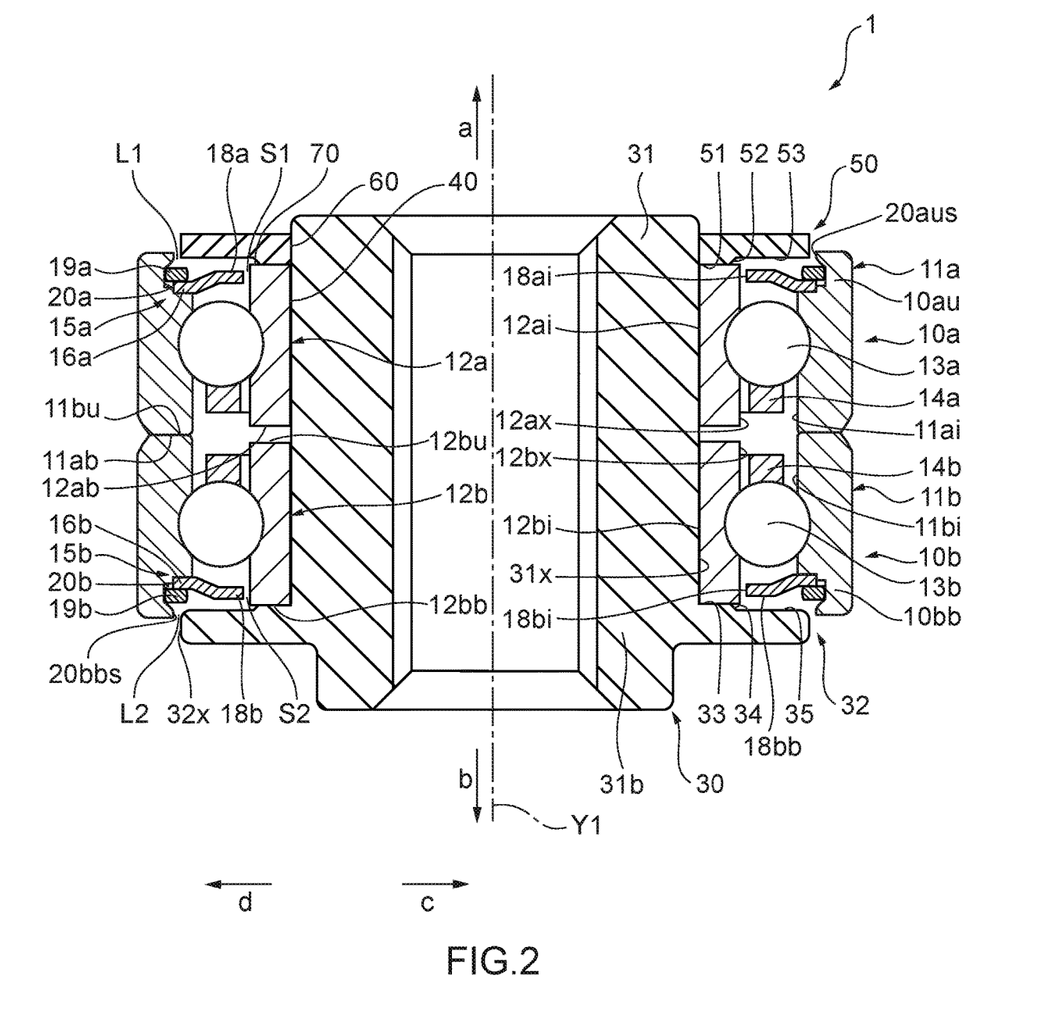
FIG. 2 is a schematic sectional view of the structure of the pivot assembly bearing device according to the embodiment of the present disclosure.
Figure 3:
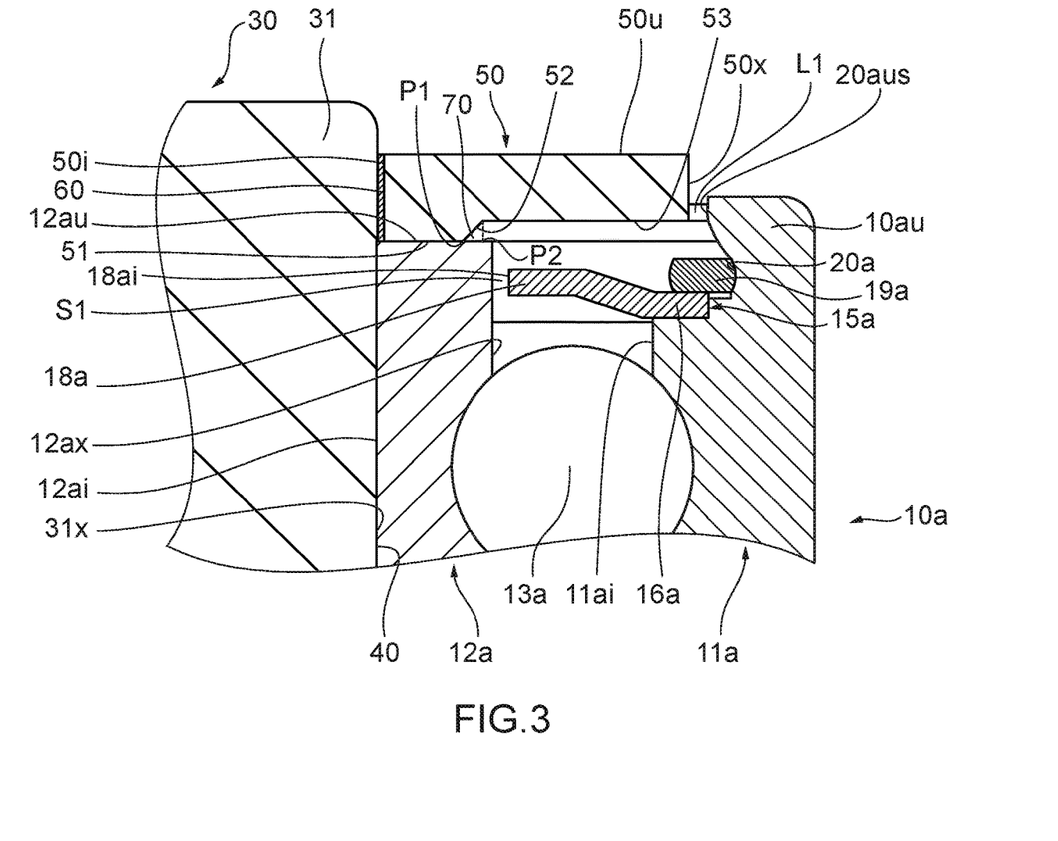
FIG. 3 is a schematic enlarged partial sectional view of the structure of a portion in the vicinity of an upper portion of an upper rolling bearing of the pivot assembly bearing device shown in FIG. 2.

FIG. 2 is a schematic sectional view of the structure of the pivot assembly bearing device 1 according to the embodiment of the present disclosure. FIG. 3 is a schematic enlarged partial sectional view of the structure of the portion in the vicinity of the upper portion of an upper rolling bearing 10*a* of the pivot assembly bearing device 1 shown in FIG. 2.

Hereinafter, for the sake of convenience in illustration, one side (indicated by the arrow "a") of the direction of the rotation axis Y1 of the pivot assembly bearing device 1 in FIG. 2 (hereinafter the direction of the rotation axis Y1 or a direction parallel to the rotation axis Y1 will be referred to as the axial direction) will be referred to as the upper side, and another side of the rotation axis Y1 (indicated by the arrow "b") will be referred to as the lower side. Further, one side (indicated by the arrow "c" heading for the rotation axis Y1) of a radial direction orthogonal to the rotation axis Y1 of the pivot assembly bearing device 1 in FIG. 2 will be referred to as the radially inner side, and another side (indicated by the arrow "d" facing away from the rotation axis Y1) of the radial direction will be referred to as the radially outer side. In the following description, the explanations referring to the positional relationship and directions of the members such as upside and downside indicate the positional relationship and directions in the drawings, and not the actual positional relationship and directions in an actual apparatus.

As shown in FIG. 2 and FIG. 3, the pivot assembly bearing device 1 according to the embodiment of the present disclosure is equipped with at least one rolling bearing 10a (upper rolling bearing 10a), a shaft 30, and a hub cap 50. The upper rolling bearing 10a has an outer ring 11a, an inner ring 12a arranged on the radially inner side (arrow c direction) of the outer ring 11a, and a plurality of rolling elements 13a arranged between the outer ring 11a and the inner ring 12a. The shaft 30 is fixed to an inner circumferential surface 12ai of the inner ring 12a of the rolling bearing 10a. The hub cap 50 is an annular cap, and is fixed to an outer circumferential surface 31x of the shaft 30 while abutting an upper end surface 12au of the inner ring 12a.

An outer circumferential surface 50x of the hub cap 50 is opposite to an inner circumferential surface 11ai of the outer ring 11a, and a labyrinth gap L1 which is an annular gap of a predetermined width is formed between the outer circumferential surface 50x of the hub cap 50 and the inner circumferential surface 11ai of the outer ring 11a.

The hub cap 50 has an inner annular surface 51, an inclined annular surface 52, and an outer annular surface 53. The inner annular surface 51 is an annular surface extending radially outwards from an inner circumferential surface 50i of the hub cap 50 bonded to the outer circumferential surface 31x of the shaft 30. The inclined annular surface 52 is an annular surface extending radially outwards from the radially outer side (arrow d direction) edge of the inner annular surface 51 while inclined so as to be away from the rolling bearing 10a. The outer annular surface 53 is an annular surface extending radially outwards from the radially outer side (arrow d direction) edge of the inclined annular surface 52.

The inner annular surface 51 contacts a part of one end surface 12au of the inner ring which extends from an inner peripheral edge to an intermediate position located on the way from an inner peripheral edge to an outer peripheral edge. An adhesive retaining portion 70 that is a predetermined annular space is formed between the area extending from the intermediate position to the outer peripheral edge of one end surface and the inclined annular surface 52 of the hub cap 50.

In this way, the hub cap 50 is fixed to the outer circumferential surface 31x of the shaft 30 through bonding while abutting the upper end surface 12au of the inner ring 12a. As a result, it is possible to form a desired labyrinth gap L1, and to suppress dispersion of particles. In bonding the hub cap 50 to the shaft 30 for fixation, there is a risk of some adhesive entering the interior of the rolling bearing 10a. This, however, can be avoided due to the adhesive retaining portion 70. As a result, it is possible to prevent the adhesive from entering the interior of the rolling bearing 10a to cause a problem such as a defective rotation of the rolling bearing 10a. Hereinafter, the structure of the pivot assembly bearing device 1 will be specifically described.

The pivot assembly bearing device 1 has two rolling bearings 10a and 10b, more specifically, the upper rolling bearing 10a arranged on the upper side, and the lower rolling bearing 10b arranged coaxially with the upper rolling bearing 10a on the lower side of the upper rolling bearing 10a. In this embodiment, the upper rolling bearing 10a and the lower rolling bearing 10b are the same ball bearings.

The pivot assembly bearing device 1 may have one rolling bearing, or an arbitrary number of two or more rolling bearings arranged coaxially. Further, the rolling bearings may be bearings other than ball bearings. The upper rolling bearing 10a and the lower rolling bearing 10b are arranged coaxially, with the axis Y1 being their center axis (rotation axis).

As shown in FIGS. 2 and 3, the upper rolling bearing 10a has the outer ring 11a extending in the axial direction as a hollow cylinder the center of which is the rotation axis Y1, the inner ring 12a arranged on the radially inner side of the outer ring 11a and extending in the axial direction as a hollow cylinder the center of which is the rotation axis Y1, and a plurality of rolling elements 13a arranged between the outer ring 11a and the inner ring 12a. The rolling elements 13a are retained at equal intervals by a retainer 14a so as to be capable of rolling around the rotation axis Y1.

The axial length of the outer ring 11a of the upper rolling bearing 10a is larger than the axial length of the inner ring 12a of the upper rolling bearing 10a. As a result, when fixed to the shaft 30, a lower end surface 11ab of the outer ring 11a abuts on an upper end surface 11bu of an outer ring 11b of the lower rolling bearing 10b described below, while a lower end surface 12ab of the inner ring 12a of the upper rolling bearing 10a is spaced away from an upper end surface 12bu of the inner ring 12b of the lower rolling bearing 10b described below.

Further, the upper rolling bearing 10a has a seal member 15a for covering the portion between the outer ring 11a and the inner ring 12a at an upper end portion 10au, and a retaining member 19a (for example, a snap ring) for causing the seal member 15a to be retained by the outer ring 11a at a radially outer side edge portion of the seal member 15a (radially outer disc portion 16a). A seal gap S1 that is an annular gap having a predetermined width is formed between the inner circumferential surface of the seal member 15a (an inner circumferential surface 18ai of the radially inner disc portion 18a) and the outer circumferential surface 12ax of the inner ring 12a.

At the upper end portion 10au of the upper rolling bearing 10a, the inner circumferential surface 11ai of the outer ring 11a has a peripheral groove 20a that is an annular groove recessed to the radially outer side from the inner circumferential surface 11ai of the outer ring 11a. The radially outer end portion of the seal member 15a is accommodated in the peripheral groove 20a and the seal member 15a is retained in the peripheral groove 20a by the retaining member 19a.

In the radial direction, the inner circumferential surface 18ai of the radially inner disc portion 18a of the seal member 15a faces the outer circumferential surface 12ax of the inner ring 12a. The seal gap S1 is an annular gap with a predetermined width in the radial direction and having the rotation axis Y1 as the center. The seal gap S1 is formed between the inner circumferential surface 18ai of the radially inner disc portion 18*a* of the seal member 15*a* and the outer circumferential surface 12*ax* of the inner ring 12*a*.

The lower rolling bearing 10*b* has a structure same to the upper rolling bearing 10*a*. In the pivot assembly bearing device 1, the lower rolling bearing 10*b* is arranged oppositely to the upper rolling bearing 10*a* in the rotation axis Y1 direction. More specifically, as shown in FIG. 2, the lower rolling bearing 10*b* has the outer ring 11*b* extending in the axial direction as a hollow cylinder with the rotation axis Y1 as the center, an inner ring 12*b* arranged on the radially inner side of the outer ring 11*b* and extending in the axial direction as a hollow cylinder the center with the rotation axis Y1 as the center, and a plurality of rolling elements 13*b* arranged between the outer ring 11*b* and the inner ring 12*b*. The rolling elements 13*b* are retained at equal intervals by a retainer 14*b* so as to be capable of rolling around the rotation axis Y1.

The axial length of the outer ring 11*b* of the lower rolling bearing 10*b* is larger than the axial length of the inner ring 12*b* of the lower rolling bearing 10*b*. As a result, when fixed to the shaft 30, an upper end surface 11*bu* of the outer ring 11*b* abuts on a lower end surface 11*ab* of the outer ring 11*a* of the upper rolling bearing 10*a* whereas the upper end surface 12*bu* of the inner ring 12*b* of the lower rolling bearing 10*b* is spaced away from the lower end surface 12*ab* of the inner ring 12*a* of the upper rolling bearing 10*a*.

Further, the lower rolling bearing 10*b* has a seal member 15*b* for covering the portion between the outer ring 11*b* and the inner ring 12*b* at an lower end portion 10*bb*, and a retaining member 19*b* for causing the seal member 15*b* to be retained by the outer ring 11*b* at an outer peripheral edge portion of the seal member 15*b* (radially outer disc portion 16*b*). A seal gap S2 that is an annular gap having a predetermined width is formed between the inner circumferential surface of the seal member 15*b* (an inner circumferential surface 18*bi* of the radially inner disc portion 18*b*) and the outer circumferential surface 12*bx* of the inner ring 12*b*.

At the lower end portion 10*bb* of the lower rolling bearing 10*b*, the inner circumferential surface 11*bi* of the outer ring 11*b* has a peripheral groove 20*b* that is an annular groove recessed to the radially outer side from the inner circumferential surface 11*bi* of the outer ring 11*b*. The radially outer end portion of the seal member 15*b* is accommodated in the peripheral groove 20*b* and the seal member 15*b* is retained in the peripheral groove 20*b* by the retaining member 19*b*.

In the radial direction, the inner circumferential surface 18*bi* of the radially inner disc portion 18*b* of the seal member 15*b* is opposite to the outer circumferential surface 12*bx* of the inner ring 12*b*. The seal gap S2 is an annular gap with the rotation axis Y1 as the center, which has a predetermined width in the radial direction, and which is formed between the inner circumferential surface 18*bi* of the radially inner disc portion 18*b* of the seal member 15*b* and the outer circumferential surface 12*bx* of the inner ring 12*b*.

As shown in FIG. 2, in the pivot assembly bearing device 1, the shaft 30 has a cylindrical portion 31 that is a hollow cylindrical main body portion extending in the axial direction, and a flange portion 32 protruding toward the radially outer side from the outer circumferential surface 31*x* at the lower end portion 31*b*. The cylindrical portion 31 and the flange portion 32 are arranged coaxially, with the rotation axis Y1 serving as their center axis. The cylindrical portion 31 and the flange portion 32 are formed in one piece.

The rolling bearings 10*a* and 10*b* are loose-fitted to the shaft 30. The upper rolling bearing 10*a* and the lower rolling bearing 10*b* are fixed to the shaft 30 by an adhesive layer 40 formed by cured adhesive. More specifically, the adhesive layer 40 is formed through solidification of adhesive between the outer circumferential surface 31*x* of the shaft 30 and the inner circumferential surfaces 12*ai* and 12*bi* of the inner rings 12*a* and 12*b* of the upper rolling bearing 10*a* and the lower rolling bearing 10*b*. Examples of the adhesive forming the adhesive layer 40 include acrylic anaerobic adhesive, epoxy type thermosetting adhesive, and ultraviolet curing acrylic anaerobic adhesive.

The flange portion 32 has an inner annular surface 33, an inclined annular surface 34 and an outer annular surface 35. The inner annular surface 33 is an annular surface extending radially outwards from the outer circumferential surface 31*x* of the cylindrical portion 31. The inclined annular surface 34 is an annular surface centered about the rotation axis Y1 and extending radially outwards from the outer peripheral edge of the inner annular surface 33, and inclined so as to be away from the lower rolling bearing 10*b*. The outer annular surface 35 is an annular surface extending radially outwards from the outer peripheral edge of the inclined annular surface 34.

In the assembled state of the pivot assembly bearing device 1, the inner annular surface 33 of the flange portion 32 abuts a lower end surface 12*bb* of the inner ring 12*b* of the lower rolling bearing 10*b*. The outer annular surface 35 of the flange portion 32 is spaced away from a lower end surface 18*bb* of a radially inner disc portion 18*b* of the seal member 15*b*.

In the radial direction, an outer circumferential surface 32*x* that is the radially outer end surface of the flange portion 32 faces a lower step surface 20*bbs* of the outer ring 11*b*. Between the outer circumferential surface 32*x* of the flange portion 32 and the lower step surface 20*bbs* of the outer ring 11*b*, a labyrinth gap L2 that is an annular gap having a predetermined width in the radial direction is formed. The lower step surface 20*bbs* is a cylindrical surface extending on the lower side of the peripheral groove 20*b* in the outer ring 11*b* and centered about the rotation axis Y1, and extends farther on the radially outer side than the inner circumferential surface 11*bi* of the outer ring 11*b*.

As shown in FIG. 3, in the pivot assembly bearing device 1, on the upper side of the upper rolling bearing 10*a*, the annular hub cap 50 extending from the outer circumferential surface 31*x* of the shaft 30 toward the radially outer side is provided in an annular shape centered about the rotation axis Y1. The hub cap 50 is arranged coaxially with the shaft 30, and is centered about the rotation axis Y1. Further, the hub cap 50 is arranged coaxially with the upper rolling bearing 10*a* and the lower rolling bearing 10*b*.

An upper end surface 50*u* of the hub cap 50 is an annular flat surface extending in the radial direction. Thus, in the pivot assembly bearing device 1, it is possible to prevent interference between the hard disk drive device 100 mounted on the distal end side (upper side) of the shaft 30 and an upper (arrow "a" direction) cover (not shown).

The hub cap 50 is loose-fitted to the cylindrical portion 31 of the shaft 30. An adhesive layer 60 is formed by cured adhesive, and the hub cap 50 is fixed to the shaft 30 by the adhesive layer 60 between the inner circumferential surface 50*i* of the hub cap 50 and the outer circumferential surface 31*x* of the shaft 30. Examples of the adhesive forming the adhesive layer 60 include acrylic anaerobic adhesive, epoxy type thermosetting adhesive, and ultraviolet curing acrylic anaerobic adhesive.

On the side where the hub cap 50 faces the upper rolling bearing 10*a*, the hub cap 50 has the inner annular surface 51, the inclined annular surface 52, and the outer annular surface 53. The inner annular surface 51 is an annular surface extending radially outwards from the inner circumferential surface 50*i*. The inclined annular surface 52 is an annular surface extending radially outwards from the outer peripheral edge of the inner annular surface 51 while inclined so as to be away from the upper rolling bearing 10*a*. The outer annular surface 53 is an annular surface extending radially outwards from the outer peripheral edge of the inclined annular surface 52.

In the assembled state of the pivot assembly bearing device 1, the inner annular surface 51 abuts a part of the upper end surface 12*au* of the inner ring 12*a*, which is defined from the inner peripheral edge to the intermediate position (position P1) between the inner peripheral edge and the outer peripheral edge.

The inclined annular surface 52 of the hub cap 50 is a conical surface centered about the rotation axis Y1. The inclined annular surface 52 extends obliquely upwards to the radially outer side from the position P1 on the upper end surface 12*au*. The outer peripheral edge of the inclined annular surface 52 is positioned radially inward from the outer peripheral edge of the upper end surface 12*au* and extends to a position which overlaps a position P2 on the upper end surface 12*au* in the radial direction. The inclined annular surface 52 is spaced away from the upper end surface 12*au* in the axial direction. However, in the radial direction, the outer peripheral edge of the inclined annular surface 52 may reach the outer peripheral edge of the upper end surface 12*au*, and may be positioned radially outward from the outer peripheral edge of the upper end surface 12*a*u.

The outer annular surface 53 of the hub cap 50 is an annular surface expanding over a plane extending in the radial direction, and extends from the outer peripheral edge of the inclined annular surface 52 toward the radially outer side. As shown in FIG. 3, in the radial direction, the outer annular surface 53 extends to the radially outer side from the position P2 on the upper end surface 12*au* of the inner ring 12*a*. That is, a part of the outer annular surface 53 faces the upper end surface 12*au* of the inner ring 12*a* in the axial direction, and is spaced away from the upper end surface 12*au*.

The outer annular surface 53 does not need to extend from a radially inward position of the outer circumferential surface 12*ax* of the inner ring 12*a*. That is, the outer annular surface 53 may extend from a radially outward position of the outer circumferential surface 12*ax* without facing the upper end surface 12*au* in the axial direction.

The outer circumferential surface 50*x* of the hub cap 50 faces an upper step surface 20*aus* of the outer ring 11*a* in the radial direction. The labyrinth gap L1 that is an annular gap having a predetermined width in the radial direction is formed between the outer circumferential surface 50*x* of the hub cap 50 and the upper step surface 20*aus* of the outer ring 11*a*. The upper step surface 20*aus* is a cylindrical surface which is centered about the rotation axis Y1 and extending on the upper side of the peripheral groove 20*a*. The upper step surface 20*aus* extends on the radially outer side than the inner circumferential surface 11*ai*.

The hub cap 50 has the inclined annular surface 52 and the outer annular surface 53. The adhesive retaining portion 70 is formed between the hub cap 50 and the portion of the upper end surface 12*au* which is from position P1 to the outer peripheral edge of the inner ring 12*a*. More specifically, the adhesive retaining portion 70 is an annular space surrounded by an annular part of the upper end surface 12*au* of the inner ring 12*a* which does not contact the inner annular surface 51 of the hub cap 50, the inclined annular surface 52 of the hub cap 50, and the portion of the outer annular surface 53 of the hub cap 50 which faces the upper end surface 12*au* of the inner ring 12*a* in the axial direction.

The inclined annular surface 52 is an inclined surface which comes upwardly away from the upper end surface 12*au* of the inner ring 12*a* as it extends toward the radially outer side. The cross sectional shape of the adhesive retaining portion 70 along the rotation axis Y1 is a wedge shape pointed toward the radially inner side. Thus, due to the capillary phenomenon, it is possible to keep the adhesive overflowed from the gap between the inner ring 12*a* and the hub cap 50, within the wedge-shaped portion on the radially inner side of the adhesive retaining portion 70. In the adhesive retaining portion 70, a space between the upper end surface 12*au* of the inner ring 12*a* and the outer annular surface 53 is provided to cause the wedge-shaped portion to be separated from the interior of the upper rolling bearing 10*a* (space between the outer ring 11*a* and the inner ring 12*a*). As a result, it is possible to more reliably prevent the adhesive from entering the interior of the upper rolling bearing 10*a*.

As shown in FIG. 2, in the assembled state of the pivot assembly bearing device 1, the upper rolling bearing 10*a* and the lower rolling bearing 10*b* are arranged in the axial direction while applying a predetermined preload to the rolling elements 13*a* and 13*b* between the outer rings 11*a* and 11*b*, and the inner rings 12*a* and 12*b*. More specifically, the lower rolling bearing 10*b* is fitted to the shaft 30 and then the upper rolling bearing 10*a* is fitted to the shaft 30. The inner ring 12*b* of the lower rolling bearing 10*b* is retained by the flange portion 32 of the shaft 30, and the upper rolling bearing 10*a* is retained by the lower rolling bearing 10*b*.

The axial lengths of the outer rings 11*a* and 11*b* of the upper rolling bearing 10*a* and the lower rolling bearing 10*b* are larger than the axial lengths of the inner rings 12*a* and 12*b* of the upper rolling bearing 10*a* and the lower rolling bearing 10*b*. Thus, when assembled to the shaft, the outer ring 11*a* of the upper rolling bearing 10*a* contacts the outer ring 11*b* of the lower rolling bearing 10*b*, whereby the upper rolling bearing 10*a* is retained by the lower rolling bearing 10*b*. At this time, the inner ring 12*a* of the upper rolling bearing 10*a* is spaced away from the inner ring 12*b* of the lower rolling bearing 10*b*. In this state, a downward preload is applied to the inner ring 12*a* of the upper rolling bearing 10*a* and the inner ring 12*a* of the upper rolling bearing 10*a* is bonded to the shaft 30. As a result, in the state in which a predetermined preload is applied to the rolling elements 13*a* and 13*b* between the outer rings 11*a* and 11*b*, and the inner rings 12*a* and 12*b* respectively, the upper rolling bearing 10*a* and the lower rolling bearing 10*b* are fixed to the shaft 30.

In the state in which the upper rolling bearing 10*a* and the lower rolling bearing 10*b* are fixed to the shaft 30, the hub cap 50 is fitted to the shaft 30 from upside, and the hub cap 50 is bonded to the shaft 30. The hub cap 50 is bonded while the inner annular surface 51 abuts the upper end surface 12*au* of the inner ring 12*a*.

As described above, in the pivot assembly bearing device 1 according to the embodiment of the present disclosure, the adhesive retaining portion 70 that is an annular space is formed between the hub cap 50 and the portion of the upper end surface 12*au* which is from position P1 to the outer peripheral edge of the inner ring 12*a*. As a result, at the time of the bonding of the hub cap 50, it is possible to keep the adhesive within the adhesive retaining portion 70 even when some adhesive having leaked from the gap between the inner circumferential surface 50*i* of the hub cap 50 and the outer circumferential surface 31*x* of the shaft 30 passes between the inner ring 12*a* of the upper rolling bearing 10*a* and the hub cap 50 and tends to enter the interior of the upper rolling bearing 10*a* from between the outer ring 11*a* and the inner ring 12*a*. Thus, it is possible to prevent the adhesive for the bonding the hub cap 50 to the shaft 30 from entering the interior of the upper rolling bearing 10*a*. At a position spaced away from the internal space between the outer ring 11*a* and the inner ring 12*a*, the adhesive retaining portion 70 has a wedge-shaped sectional shape pointed toward the radially inner side. Thus, due to the capillary phenomenon, the adhesive overflowing from the gap between the inner ring 12*a* and the hub cap 50 can be kept at the radially inner side portion of the adhesive retaining portion 70 spaced away from the internal space between the outer ring 11*a* and the inner ring 12*a*. Thus, it is possible to more reliably prevent the adhesive for the bonding the hub cap 50 to the shaft 30 from entering the interior of the upper rolling bearing 10*a*.

Further, in the pivot assembly bearing device 1 according to the embodiment of the present disclosure, the labyrinth gap L1 is formed between the outer circumferential surface 50*x* of the hub cap 50 and the upper step surface 20*aus* of the inner circumferential surface 11*ai* of the outer ring 11*a*. Thus, even in the case where lubricant such as grease used in the upper rolling bearing 10*a* is vaporized or atomized and particles (contamination particles) is generated from the upper rolling bearing 10*a*, it is possible to suppress dispersion of the particles to the exterior from the upper rolling bearing 10*a* due to the labyrinth gap L1.

Further, the labyrinth gap L2 is formed between the outer circumferential surface 32*x* of the flange portion 32 of the shaft 30 and the lower step surface 20*bbs* of the outer ring 11*b*. Thus, as in the case of the labyrinth gap L1, even in the case where lubricant such as grease used in the lower rolling bearing 10*b* is vaporized or atomized and particles is generated from the lower rolling bearing 10*b*, it is possible to suppress dispersion of the particles to the exterior from the lower rolling bearing 10*b* due to the labyrinth gap L2.

The present disclosure is not restricted to the above-described embodiment but includes all modes included in the scope of the disclosure and the claims. Further, in order that the above-described effect may be at least partially exerted, the components may be selectively combined as appropriate. For example, the configuration, material, arrangement, size, etc. of each component in the above embodiment can be appropriately changed according to the mode of use of the disclosure.

In the pivot assembly bearing device 1 according to the embodiment of the present disclosure, the adhesive retaining portion 70 is formed between a part on the radially outer side of the upper end surface 12*au* of the inner ring 12*a* of the upper rolling bearing 10*a* and the hub cap 50. However, this should not be construed restrictively. For example, as shown in FIG. 4, another adhesive retaining portion 71 may be formed.

Figure 4:
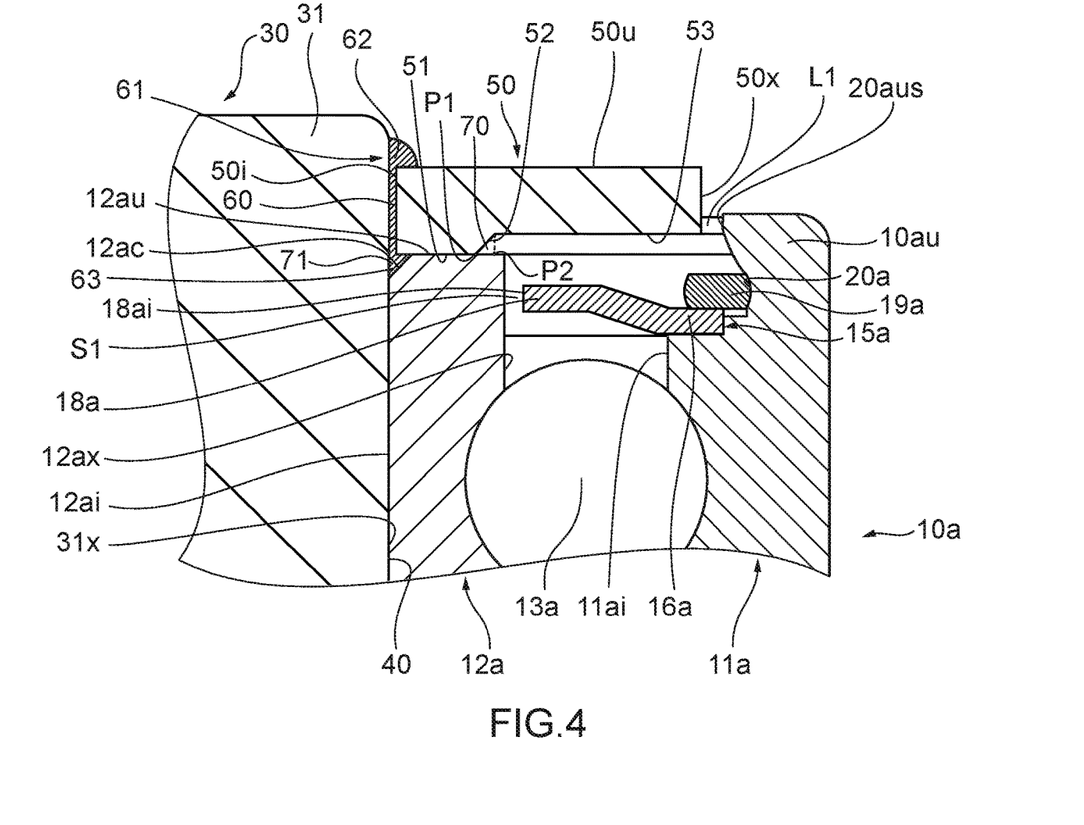
FIG. 4 is a schematic enlarged sectional view of the structure of a variant of an adhesive layer of the pivot assembly bearing device according to the embodiment of the present disclosure.

FIG. 4 is an enlarged schematic sectional view of the structure of the other adhesive retaining portion 71 of the pivot assembly bearing device 1 according to the embodiment of the present disclosure. In addition to the adhesive retaining portion 70, the pivot assembly bearing device 1 may have the adhesive retaining portion 71. In the present variant, an annular inclined surface 12*ac* is provided at the radially inner side corner of the inner ring 12*a* at the upper end portion 10*au* of the upper rolling bearing 10*a*, and the inclined surface 12*ac* forms an annular space as the adhesive retaining portion 71 between the inclined surface 12*ac* and the shaft 30. The inclined surface 12*ac* extends obliquely downwards to the radially inner side from the upper end surface 12*au* of the inner ring 12*a*.

More specifically, the adhesive retaining portion 71 is an annular space surrounded by at least a part of the inner annular surface 51 of the hub cap 50 facing the inclined surface 12*ac* of the inner ring 12*a*, the inclined surface 12*ac* of the inner ring 12*a* of the upper rolling bearing 10*a*, and the outer circumferential surface 31*x* of the shaft 30. The inclined surface 12*ac* of the inner ring 12*a* is situated on the radially inner side of the inclined annular surface 52 of the hub cap 50.

In this way, in the pivot assembly bearing device 1 according to the variant of the embodiment of the present disclosure, the inclined surface 12*ac* of the inner ring 12*a* forms the adhesive retaining portion 71 between the hub cap 50 and the shaft 30. Thus, before the adhesive reaches the adhesive retaining portion 70, the adhesive can be kept at the adhesive retaining portion 71, making it possible to more reliably prevent the adhesive between the inner circumferential surface 50*i* of the hub cap 50 and the outer circumferential surface 31*x* of the shaft 30 from entering the interior of the upper rolling bearing 10*a*.

Further, in the pivot assembly bearing device 1 according to the embodiment of the present disclosure, the adhesive layer 60 is formed between the inner circumferential surface 50*i* of the hub cap 50 and the outer circumferential surface 31*x* of the shaft 30, this should not be construed restrictively. For example, as shown in FIG. 4, an adhesive layer 61 may be formed.

FIG. 4 is an enlarged schematic sectional view of the structure of a variant of the adhesive layer 60 of the pivot assembly bearing device 1 according to the embodiment of the present disclosure. In the adhesive layer 61 as a variant of the pivot assembly bearing device 1 shown in FIG. 1, an adhesive layer 62 is formed between the upper end surface 50*u* of the hub cap 50 (the surface on the side opposite to the inner annular surface 51) and the outer circumferential surface 31*x* of the shaft 30 in addition to the adhesive layer 60. The adhesive layer 62 extends to a part on the radially inner side of the upper end surface 50*u* of the hub cap 50. In another variant of the adhesive layer 60 of the pivot assembly bearing device 1 shown in FIG. 4, an adhesive layer 63 is formed at the adhesive retaining portion 71 as the adhesive layer 61 in addition to the adhesive layers 60 and 62.

In this way, in the variant of the pivot assembly bearing device 1 according to the embodiment of the present disclosure, the adhesive layer 60 and the adhesive layer 62 connected to the adhesive layer 60 are provided as the adhesive layer 61. As a result, it is possible to enlarge the bonding area between the shaft 30 and the hub cap 50, making it possible to fix the hub cap 50 to the shaft 30 more firmly. Further, the adhesive layer 62 can have the function to prevent the hub cap 50 from being pulled out.

In the adhesive layer 61 as the other variant of the pivot assembly bearing device 1 according to the embodiment of the present disclosure, the adhesive layer 62 (second adhesive layer) and the adhesive layer 63 (third adhesive layer) are provided in addition to the adhesive layer 60 (first adhesive layer). In the present other variant, the adhesive layer 62 and the adhesive layer 63 are respectively connected to the adhesive layer 60 on the upper side and the lower side of the adhesive layer 60. Thus, the hub cap 50 can be bonded so as to be arranged between the adhesive layer 62 and the adhesive layer 63, making it possible to fix the hub cap 50 to the shaft 30 more firmly.

In the case where an ultraviolet curing acrylic anaerobic adhesive is employed as the adhesive of the adhesive layer 61, the adhesive layer 60 and the adhesive layer 63 are cured by the anaerobic curing mechanism, and the adhesive layer 62 is cured through application of ultraviolet rays.

Thus, the hub cap 50 can be fixed to the shaft 30 more easily.

Further, in the pivot assembly bearing device 1 according to the embodiment of the present disclosure, although the inclined annular surface 52 of the hub cap 50 is a conical surface, this should not be construed restrictively. For example, as shown in FIG. 5, an adhesive retaining portion 72 may be formed.

Figure 5:
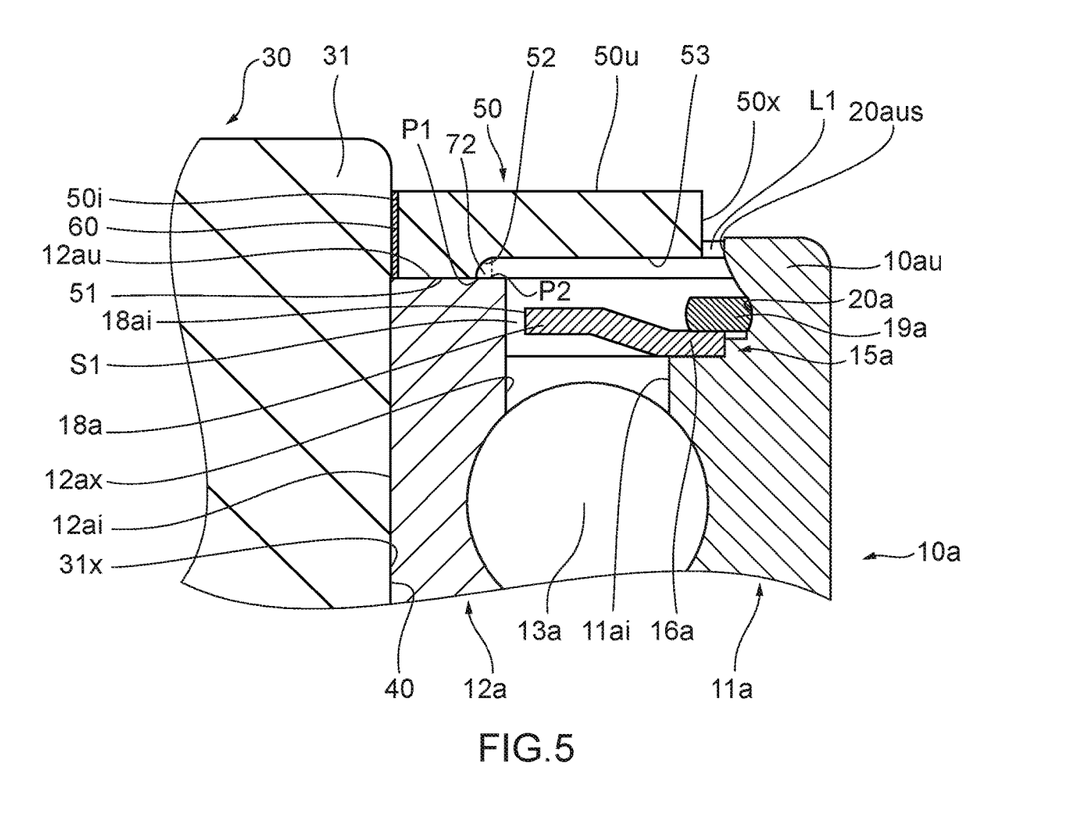
FIG. 5 is a schematic enlarged sectional view of a variant of an adhesive retaining portion of the pivot assembly bearing device according to the embodiment of the present disclosure shown in FIG. 2.

FIG. 5 is an enlarged schematic sectional view of the structure of a variant of the adhesive retaining portion 70 of the pivot assembly bearing device 1 according to the embodiment of the present disclosure shown in FIG. 2. In the variant of the adhesive retaining portion 70 of the pivot assembly bearing device 1, the inclined annular surface 52 of the hub cap 50 is a concave curved surface recessed from the adhesive retaining portion 70. More specifically, the inclined annular surface 52 of the hub cap 50 is a curved surface recessed to the inner side of the hub cap 50. The inclined annular surface 52 has no sharp corner portion between the inner annular surface 51 and the outer annular surface 53, and is smoothly connected.

Further, in the pivot assembly bearing device 1 according to the embodiment of the present disclosure, the axial lengths of the outer rings 11a and 11b of the upper rolling bearing 10a and the lower rolling bearing 10b are larger than the axial lengths of the inner rings 12a and 12b of the upper rolling bearing 10a and the lower rolling bearing 10b. However, this should not be construed restrictively. For example, the axial lengths of the outer ring 11a and the inner ring 12a of the upper rolling bearing 10a may be the same, and the axial lengths of the outer ring 11b and the inner ring 12b of the lower rolling bearing 10b may be the same. In this case, a spacer may be provided in the axial direction between the outer ring 11a and the outer ring 11b of the upper rolling bearing 10a and the lower rolling bearing 10b. More specifically, in the upper rolling bearing 10a and the lower rolling bearing 10b, the outer rings 11a and 11b abut on each other via the spacer in the axial direction, and the inner rings 12a and 12b are spaced away from each other in the axial direction.

Further, in the pivot assembly bearing device 1 according to the embodiment of the present disclosure, there is no sleeve holding the upper rolling bearing 10a and the lower rolling bearing 10b at a predetermined interval in the direction of the rotation axis Y1, but this should not be construed restrictively. A sleeve holding the upper rolling bearing 10a and the lower rolling bearing 10b at a predetermined interval in the direction of the rotation axis Y1 may be provided. This sleeve holds the outer rings 11a and 11b. In this case, the axial lengths of the outer ring 11a and the inner ring 12a of the upper rolling bearing 10a may be the same, and the axial lengths of the outer ring 11b and the inner ring 12b of the lower rolling bearing 10b may be the same.

In this way, in the assembled state of the pivot assembly bearing device of the present disclosure, the upper rolling bearing 10a and the lower rolling bearing 10b are arranged in the axial direction, with predetermined preloads being applied to them.

What is claimed is:

1. A bearing device comprising;
    at least one rolling bearing having an outer ring, an inner ring arranged on a radially inner side of the outer ring, and a plurality of rolling elements arranged between the outer ring and the inner ring;
    a shaft fixed to an inner circumferential surface of the inner ring of the rolling bearing; and
    an annular hub cap fixed to an outer circumferential surface of the shaft while abutting one end surface of the inner ring in an axial direction of the shaft,
    wherein an outer circumferential surface of the hub cap is opposite to an inner circumferential surface of the outer ring, and a labyrinth gap is formed between the outer circumferential surface of the hub cap and the inner circumferential surface of the outer ring;
    the hub cap has an inner annular surface that is an annular surface extending radially outwards from an inner circumferential surface of the hub cap bonded to the outer circumferential surface of the shaft, an inclined annular surface extending radially outwards from an outer peripheral edge of the inner annular surface while inclined so as to come away from the rolling bearing, and an outer annular surface extending radially outwards from an outer peripheral edge of the inclined annular surface;
    in the axial direction of the shaft, the inner annular surface contacts a part of the one end surface of the inner ring, which extends from an inner peripheral edge to an intermediate position located on the way from the inner peripheral edge to an outer peripheral edge of the one end surface; and
    an adhesive retaining portion that is a predetermined annular space is formed between the area extending from the intermediate position to the outer peripheral edge of the inner ring and at least the inclined annular surface of the hub cap.

2. The bearing device according to claim 1, wherein the outer peripheral edge of the inclined annular surface is positioned radially inward from the outer peripheral edge of the inner ring.

3. The bearing device according to claim 1, wherein the inclined annular surface is a conical surface.

4. The bearing device according to claim 1, wherein the inclined annular surface is a concave curved surface.

5. The bearing device according to claim 1, wherein the inner ring has an another inclined annular surface at an inner peripheral edge at the one end portion of the inner ring; and
    the another inclined annular surface forms an annular space as another adhesive retaining portion between the inclined surface and the shaft.

6. The bearing device according to claim 1, further comprising: a first adhesive layer between the inner circumferential surface of the hub cap and the outer circumferential surface of the shaft; and
    a second adhesive layer extending along the surface of the hub cap on the side opposite to the inner annular surface and the outer circumferential surface of the shaft, and connected to the first adhesive layer.

* * * * *